United States Patent
Tanabe et al.

(10) Patent No.: US 6,646,649 B1
(45) Date of Patent: Nov. 11, 2003

(54) IMAGE DISPLAY DEVICE, ELECTRONIC APPARATUS HAVING SAME, AND IMAGE DISPLAY METHOD

(75) Inventors: Kenichi Tanabe, Tokyo (JP); Hiroshi Ono, Tokyo (JP); Yoshiharu Konishi, Suwa (JP); Hitoshi Hayama, Suwa (JP)

(73) Assignees: King Jim Co., Ltd. (JP); Seiko Epson Corporation (JP)

( * ) Notice: Subject to any disclaimer, the term of this patent is extended or adjusted under 35 U.S.C. 154(b) by 0 days.

(21) Appl. No.: 09/475,215

(22) Filed: Dec. 29, 1999

(30) Foreign Application Priority Data

Jan. 14, 1999 (JP) .............................. 11-007575

(51) Int. Cl.⁷ ................................................. G09G 5/00
(52) U.S. Cl. ....................... 345/588; 345/589; 345/592; 345/593; 345/596; 345/597
(58) Field of Search .................. 345/147, 597, 345/589, 596, 592, 593, 600, 636, 25, 26, 17, 467, 588

(56) References Cited

U.S. PATENT DOCUMENTS

| | | | | |
|---|---|---|---|---|
| 4,924,299 A | * | 5/1990 | Mizuno et al. | 358/22 |
| 5,195,180 A | * | 3/1993 | Takakura et al. | 345/164 |
| 5,907,315 A | * | 5/1999 | Vlahos et al. | 345/114 |

FOREIGN PATENT DOCUMENTS

JP  11-231289  8/1999

* cited by examiner

*Primary Examiner*—Kristine Kincaid
*Assistant Examiner*—Mylinh T Tran
(74) *Attorney, Agent, or Firm*—Lorusso, Loud & Kelly

(57) ABSTRACT

A monochrome display device easily and clearly distinguishes a multicolored character image from a multicolored background image by employing four gradations of monochrome. First and second monochrome gradations are assigned to any respective non-colored and colored elements of the background image and third and fourth monochrome gradations are assigned to any respective non-colored and colored elements of the character image to display a composite image of the background image and the character image.

8 Claims, 10 Drawing Sheets

| "Background Color Group" | Default (Non-Coloring) | Color Designation (Coloring) |
|---|---|---|
| Background Color | Negative | Dark Gray |
| Intra-Frame Color | Negative | Dark Gray |
| Intra-Enclosing Color | Negative | Dark Gray |

FIG.8B

| "Character Color Group" | Default (Non-Coloring) | Color Designation (Coloring) |
|---|---|---|
| Ground Tint Color | Non Display | Non Display |
| Closing-Line Color | Positive | Light Gray |
| Enclosing-Line Color | Positive | Light Gray |
| Half-Tone Dot Meshing Color | Positive | Light Gray |
| Character Color | Positive | Light Gray |

FIG.9A

| "Background Color Group" | Default (Non-Coloring) | Color Designation (Coloring) |
|---|---|---|
| Background Color | Negative | Dark Gray |
| Intra-Frame Color | Negative | Dark Gray |
| Intra-Enclosing Color | Negative | Dark Gray |

FIG.9B

| "Caractor Color Group" | Default (Non-Coloring) | Color Designation (Coloring) |
|---|---|---|
| Ground Tint Color | Positive | Light Gray |
| Closing-Line Color | Positive | Light Gray |
| Enclosing-Line Color | Positive | Light Gray |
| Half-Tone Dot Meshing Color | Positive | Light Gray |
| Caracter Color | Positive | Light Gray |

IMAGE DISPLAY DEVICE, ELECTRONIC APPARATUS HAVING SAME, AND IMAGE DISPLAY METHOD

BACKGROUND OF THE INVENTION

1. Field of the Invention

The present invention relates generally to an image display device for displaying a color-printable image as a monochrome image in, e.g., a tape printing apparatus or a word processor, an electronic apparatus having the image display device, and an image display method for the image display device.

2. Description of Conventional Art

For image display devices of conventional color-printable electronic apparatuses of this type, monochrome liquid crystal display are often used in order to lower the prices of the apparatuses. When a color-printable image is displayed on such a monochrome liquid display, the image is displayed with white, black or gray on the basis of gradation (lightness). That is, when the gradation of the image has a value expressing a light color, the image is expressed with white or a gray close to white. On the other hand, when the graduation of the image has a value expressing a dark color, the image is expressed with black or a gray close to black.

Thus, when a color-printable image is displayed on a monochrome liquid crystal display, the image is displayed on the basis of only gradation regardless of color data concerning three colors (e.g., red, green and blue). For that reason, even if color data of an image of inputted characters (a character image) are different from color data of an image of a background (a background image) for the character image, when the gradation of the character image is the same as that of the background image, both images are displayed with the same light and shade. Therefore, the character image on the monochrome liquid crystal display is displayed so as to be buried in the background image, so that it is very difficult to distinguish the character image from the background image.

SUMMARY OF THE INVENTION

It is therefore an object of the present invention to eliminate the aforementioned problems and to provide an image display device capable of easily and clearly distinguishing a character image from a background image even if a color-printable image is displayed as a monochrome image, an electronic apparatus having the image display device, and an image display method for the image display device.

In order to accomplish the aforementioned and other objects, according to one aspect of the present invention, an image display device comprises: means for displaying a color-printable background image and a color-printable character image superposed on the background image, as monochrome images; and gradation control means for assigning a first gradation and a second gradation to the non-coloring and coloring of an element of the background image, respectively, and assigning a third gradation and a fourth gradation to the non-coloring and coloring of an element of the character image, respectively, to display a composite image of the background image and the character image.

The gradation control means may set a display based on the first gradation to be a negative display, a display based on the second gradation to be a dark color display, a display based on the third gradation to be a positive display, and a display based on the fourth gradation to be a light color display.

Preferably, the gradation control means does not display a ground tint element of the character image regardless of the non-coloring or coloring of the ground tint element.

In addition, the gradation control means may alternatively display the composite image of the background image and the character image on an input screen with print image or an print image sole screen, and cause the assignment of the first through fourth graduations when the composite image of the background image and the character image is displayed on the input screen with print image, to be different from the assignment of the first through fourth graduations when the composite image of the back ground image and the character image is displayed on the print image sole screen, with respect to at least a part of display elements.

Moreover, the gradation control means may cause the assignment of the first through fourth graduations when the composite image of the background image and the character image is displayed on the input screen with print image, to be different from the assignment of the first through fourth graduations when the composite image of the back ground image and the character image is displayed on the print image sole screen, with respect to a ground tint element of the character image.

According to another aspect of the present invention, an electronic apparatus comprises the above described image display device, and printing means capable of color-printing a display result of the image display device.

According to a further aspect of the present invention, there is provided an image display method for displaying a color-printable background image and a color-printable character image superposed on the back ground image, as monochrome images, wherein a first gradation and a second gradation are assigned to the non-coloring and coloring of an element of the background image, respectively, and a third gradation and a fourth gradation are assigned to the non-coloring and coloring of an element of the character image, respectively, to display a composite image of the background image and the character image.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings.

DESCRIPTION OF THE PREFERRED EMBODIMENTS

Referring now to the accompanying drawings, a preferred embodiment of an image display device, an electronic apparatus having the device and an image display method for the device, according to the present invention, which are applied to a tape printing apparatus, will be described below.

Figure 1A:
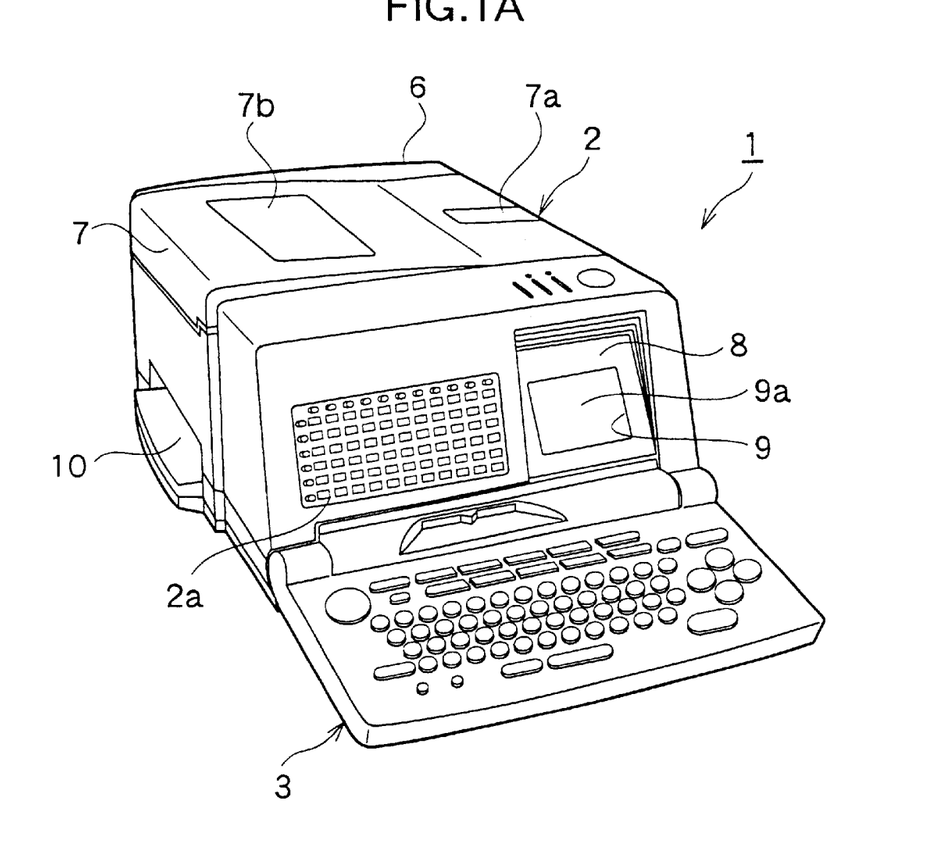
FIGS. 1A and 1B are perspective views of a tape printing apparatus, to which a preferred embodiment of a printing apparatus according to the present invention is applied.
Figure 1B:
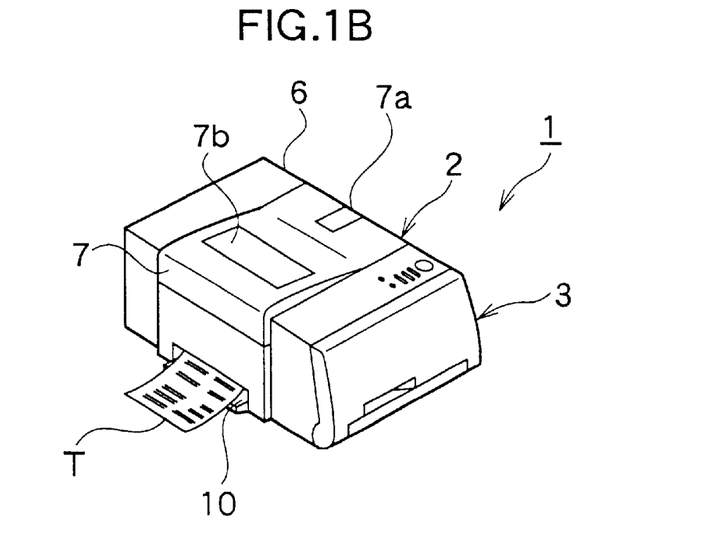

As shown in FIGS. 1A and 1B, a tape printing apparatus 1 is designed to color-print desired characters or the like, which have been keyed, on a tape T by the ink-jet system to cut a printed part out of the tape T to prepare a label.

The tape printing apparatus 1 comprises an apparatus body 2, a keyboard 3 for inputting and editing characters, a tape cartridge 4 (see FIG. 2) for housing therein a tape T serving as a printed medium, and an ink cartridge 5 (see FIG. 2) which is filled with four color inks. The tape cartridge 4 and the ink cartridge 5 are detachably mounted on the apparatus body 2.

The apparatus body 2 has an apparatus case 6 as an outer frame, and a lid 7 which is provided on the top of an intermediate portion of the apparatus body 6 and which is open and closed when the tape cartridge 4 and the ink cartridge 5 are attached or detached. The lid 7 has transparent windows 7a and 7b for allowing the loaded tape cartridge 4 and ink cartridge 5 to be visible to the naked eye. In the right part on the front side (on the side of the keyboard 3) of the apparatus case 6, there is formed a small window 9 corresponding to an image display part 8 which is built in the apparatus body 2. A transparent panel 9a is built in the small window 9. In addition, in the left part on the front side (on the side of the keyboard 3) of the apparatus case 6, a region 2a capable of sticking a color reference label is ensured (FIG. 1A shows the state that the color reference label is stuck). Moreover, on the side surface (on the left surface in the figure) of the apparatus case 6, a tape exit 10 for feeding the tape T to the outside is formed.

Figure 2:
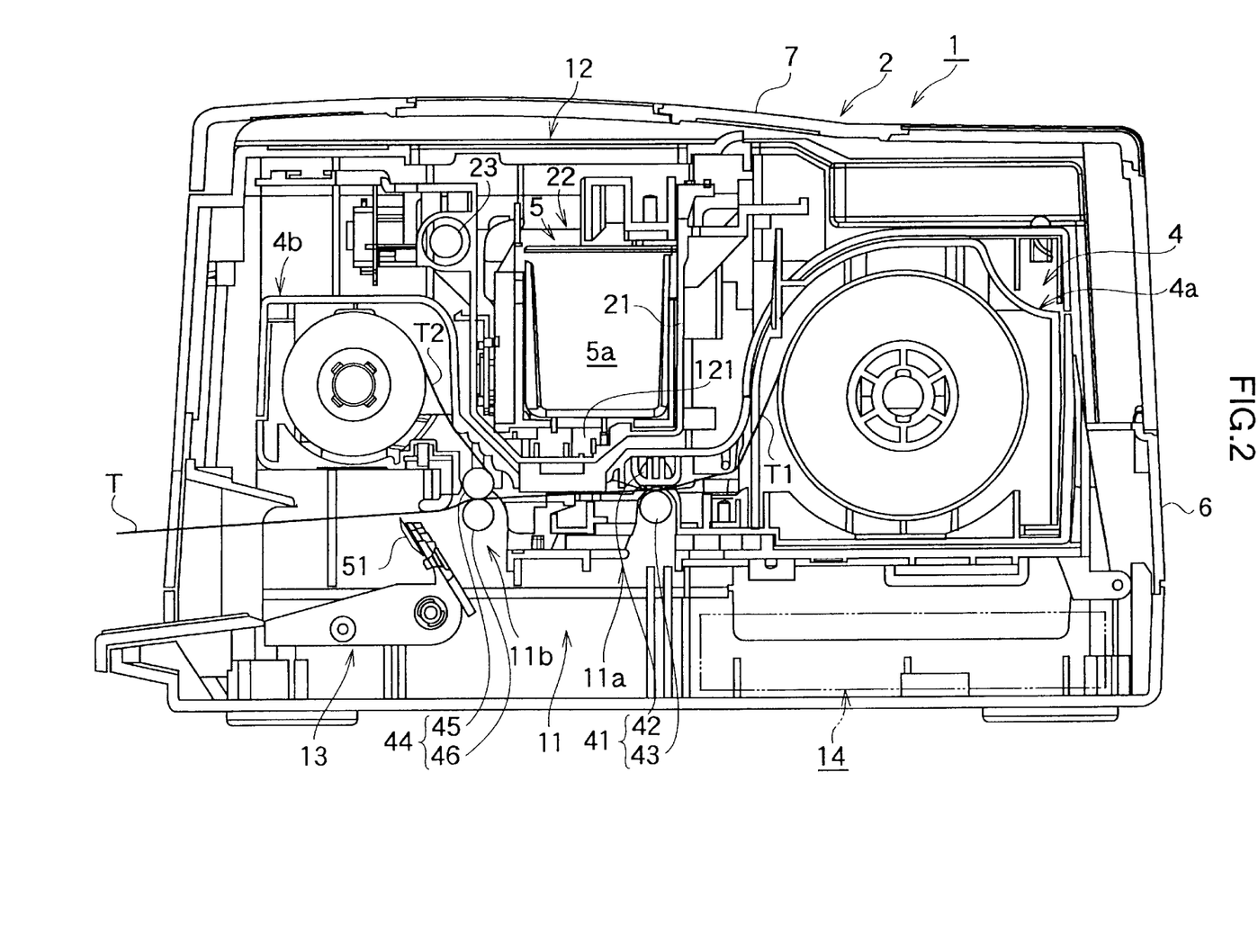
FIG. 2 is a sectional view showing the internal structure of an apparatus body of the tape printing apparatus in the preferred embodiment.

As shown in FIG. 2, in the apparatus case 6, there are mounted the tape cartridge 4 for housing therein the tape T wound onto the tape cartridge 4, a tape feeding part 11 for feeding the tape T to the outside of the apparatus body 2, a printing part 12 for color-printing an image to be printed, a cutting part 13 for cutting the tape T, and a circuit part 14 for controlling the respective parts of the tape printing apparatus 1.

The tape cartridge 4 comprises a printed tape T1, on which an image to be printed is printed, and a laminate tape T2 which is stuck on the printed portion of the printed tape T1. The printed tape T1 and the laminate tape T2 are wound onto and housed in a printed tape housing part 4a and a laminate tape housing part 4b, respectively, which are provided on both sides of the printing part 12. The printed tape T1 comprises a base tape, an adhesive layer applied on the reverse surface of the base tape, and a released paper tape mounted on the adhesive layer. On the other hand, the laminate tape T2 comprises a base tape of a transparent film, and an adhesive layer applied on the reverse surface of the base tape. The width of the base tape of the laminate tape T2 is substantially the same as that of the printed tape T1. During printing, the base tape of the laminate tape T2 is stuck on the printed tape T1 so that both side edges thereof are trued up.

As the tape cartridge 4, there are some tape cartridges which house therein only the printed tape T1 and which do not have the laminate tape T2. As the printed tape T1 to be housed in the tape cartridge 4, various printed tapes having different widths are prepared.

The printing part 12 comprises a print head 121 having a large number of ink nozzles (not shown) arranged on the tip thereof, a cartridge holder 21 provided on the upper side of the print head 121, an ink cartridge 5 detachably mounted on the print head 121 via the cartridge holder 21, and a carriage 22, on which the print head 121 and the ink cartridge 5 are mounted. The ink cartridge 5 has an ink tank 5a filled with four color inks of yellow, cyanogen, magenta and black. When the ink cartridge 5 is mounted on the print head 121, the ink tank 5a of the ink cartridge 5 for the respective colors is communicated with the printed head 121 to allow the supply of the inks of the respective colors.

The carriage 22 is slidably mounted on a carriage guiding shaft 23 extending in the lateral directions of the printed tape T1. The carriage 22 is designed to be reciprocated right and left (in the lateral directions of the printed tape T1) by means of a timing belt (not shown) by the reciprocal driving of a carriage motor (CR motor) 122 (see FIG. 5). In addition, the carriage 22 has a projecting shading plate (not shown). When the shading plate faces a position sensor 98 (see FIG. 5) of a photo-interrupter or the like, it is detected that the print head 121 is positioned at a home position (not shown), and a position correction, such as a zero point correction, is carried out. That is, since the home position serves as a waiting position for the print head 121 and as a reference position during printing, it is possible to accurately move the carriage 22 to the respective positions in the lateral directions in a printed range of the printed tape T1 by rotating the CR motor 122 from the reference position by a predetermined number of steps, so that it is possible to carry out a desired color printing on the surface of the printed tape T1 by driving the print head 121 in synchronism with the movement of the carriage 22.

The tape cartridge 4 is provided with an identification plate (not shown) indicative of identification information by a bit pattern or the like. When the identification sensor 99 (see FIG. 5) mounted on the carriage 22 faces the identification plate, the kind of the tape T and the printing starting position on the printed tape T1 of the tape T are detected.

The tape feeding part 11 has a printed-tape-side feed mechanism 11a and a laminate-tape-side feed mechanism 11b, which are provided on both sides of the print head 121 on the upstream and downstream sides in the feed direction, respectively. The printed-tape-side feed mechanism 11a comprises: a feed roller 41 comprising a feed driven roller 42 and a feed driving roller 43 which are arranged up and down; and a tape feed motor (PF motor) 111 (see FIG. 5) for rotating the feed driving roller 43.

The feed driving roller 43 is provided on the apparatus body 2, and the feed driven roller 42 is provided on the tape cartridge 4. After the tape cartridge 4 is mounted in the apparatus body 2, the feed driven roller 42 causes the printed tape T1 to be nipped between the feed driven roller 42 and the feed driving roller 43 so as to press the printed tape T1 on the feed driving roller 43. When the tape feed motor 111 rotates in this state, the printed tape T1 nipped between the feed driven roller 42 and the feed driving roller 43 is fed forwards.

On the other hand, the laminate-tape-side feed mechanism 11b comprises: a laminate roller 44 comprising a laminate driven roller 45 and a laminate driving roller 46 which are arranged up and down; and a laminate motor (not shown) for rotating the laminate driving roller 46. Furthermore, the laminate motor is the same as the above described tape feed motor (the PF motor 111), and the power thereof is divided by a speed reducing gear train (not shown) to operate the feed roller 41 and the laminate roller 44.

Similar to the above described feed driving roller 43 and feed driven roller 43, the laminate driving roller 46 and the laminate driven roller 45 are provided in the apparatus body 2 and the tape cartridge 4, respectively. After the tape cartridge 4 is mounted in the apparatus body 2, the laminate driven roller 45 causes the printed tape T1 and the laminate tape T2 to be nipped between the laminate driven roller 45 and the laminate driving roller 46 so as to press the printed tape T1 and the laminate tape T2 on the laminate driving roller 46. When the laminate motor rotates in this state, the printed tape T1 and the laminate tape T2, which are nipped between the laminate driven roller 45 and the laminate driving roller 46, are fed forwards while being stuck on another.

The cutting part 13 comprises a cutter 51, and a cutter motor 131 (see FIG. 5) for driving the cutter 51. After printing is completed, the tape T is step-fed by a predetermined distance by means of the PF motor 111 to be stopped. Immediately thereafter, the cutter motor 131 is driven to cut the printed portion of the tape T.

The keyboard 3 is mounted on the apparatus body 2 so as to be pivotable between a vertical state and a horizontal state. When the tape printing apparatus 1 is used, the keyboard 3 is in the horizontal state (see FIG. 1A), and when the tape printing apparatus 1 is carried or stored, the keyboard 3 is in the vertical state (see FIG. 1B). Thus, the tape printing apparatus 1 has excellent portability and storability since the whole apparatus is compact when being carried or stored.

Figure 3:
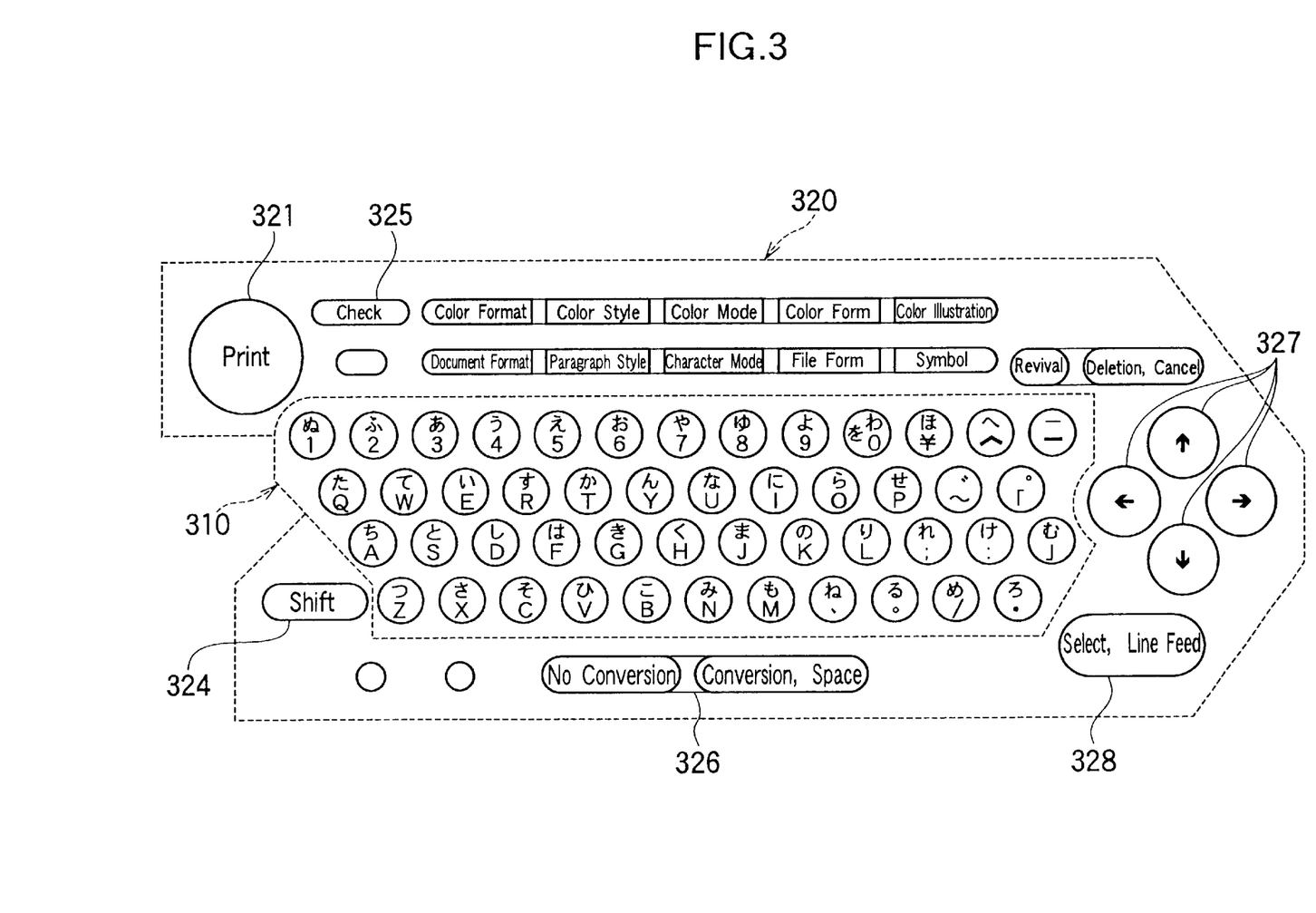
FIG. 3 is a schematic diagram showing the key array of a keyboard in the preferred embodiment.

FIG. 3 shows the key array of the keyboard 3. As shown in FIG. 3, the keyboard 3 is provided with a large number of character keys 310 for inputting characters, such as letters and symbols, and a plurality of function keys 320 arranged on the upper, lower and right sides of the character keys 310. Each of the character keys 310 has a circular convex shape. On the surface and upper side thereof, hiragana characters, alphabets, numeric characters and symbols are described. On the other hand, most of the function keys 320 have a rectangular or elliptic convex shape, and the function of each key and so forth are described on the surface and upper side thereof.

Most of the upper function keys 320 serve to change the operation mode of the tape printing apparatus 1 to any one of various editing modes. Therefore, by depressing these keys, the operation mode can be changed to, e.g., an editing mode for setting the background of an inputted character image or an editing mode for setting the color of characters of the character image. Furthermore, on the left end of the upper row of the function keys 320, a print key 321 for commanding a print operation is arranged.

On the other hand, the lower and right rows of the function keys 320 include keys for converting characters into kanji when the operation mode is an input mode and for selecting a desired one from options when the operation mode is an editing mode. Therefore, for example, when input characters are converted into kanji, the user suitably operates a conversion key 326, a cursor key 327 and a select key 328. Furthermore, a shift key 324 is provided for inputting a character described on the upper side of any one of the character keys 310 or for carrying out a function described on the upper side of any one of the function keys 320, by simultaneously depressing the corresponding one of the character keys 310 and the corresponding one of the function keys 320. In addition, reference number 325 denotes a check key for starting the function of displaying the set value of each of the set edited items to check the set value. Furthermore, a power supply key is not provided on the keyboard 3, and it is provided on the front side of the upper surface of the apparatus body 2.

Figure 4:
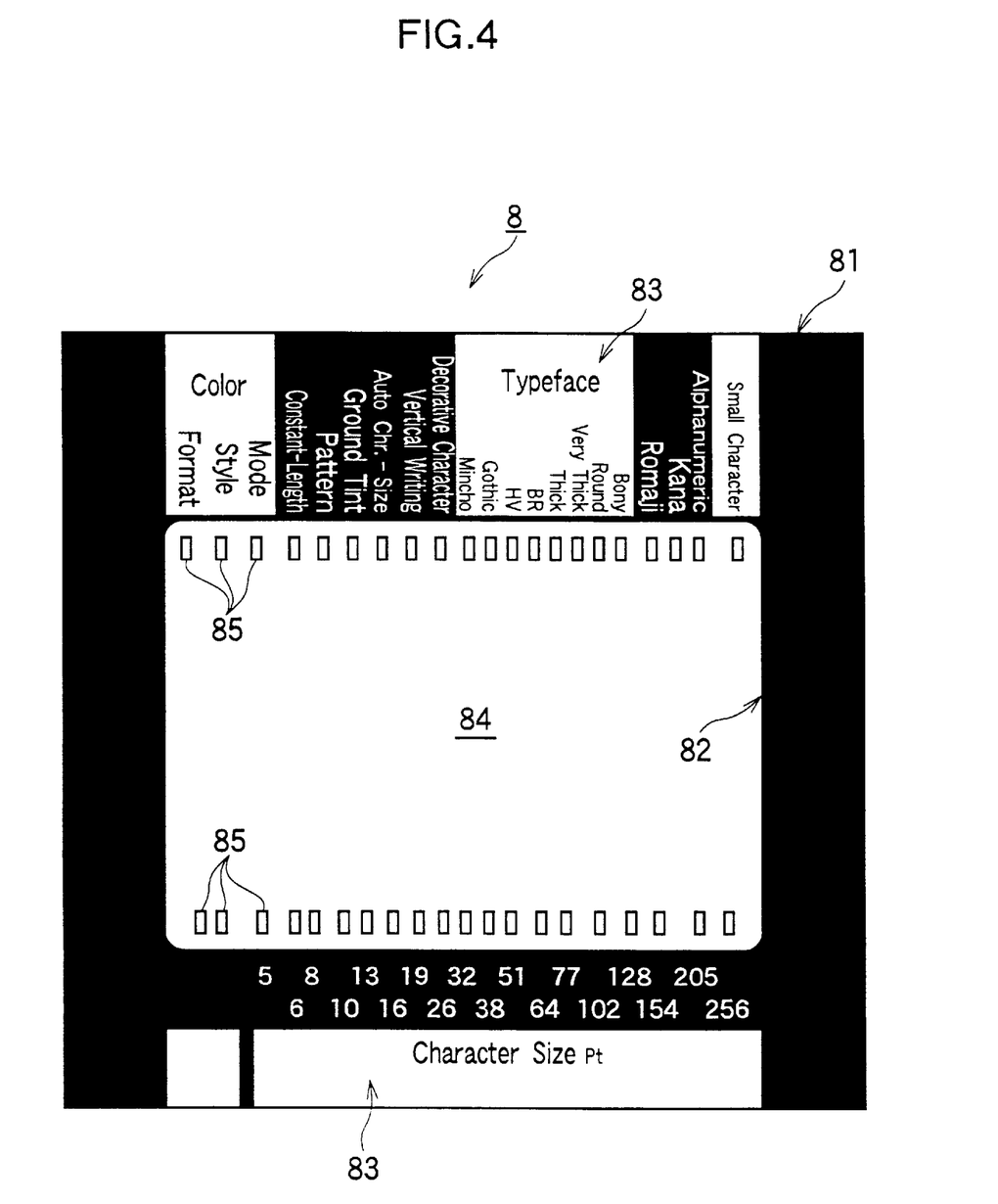
FIG. 4 is an enlarged plan view of an image display part in the preferred embodiment.

FIG. 4 is an enlarged plan view of the image display part 8. The image display part 8 has a display screen 81 for displaying an image of input characters and so forth. The display screen 81 comprises a monochrome liquid crystal display, which comprises: a liquid crystal display part 82 for displaying the image and a plurality of indicators 85, which will be described later, by a liquid crystal; and a mode describing part 83, which is provided around the liquid crystal display part 82 and on which the meaning of each of the indicators 85 has been previously described. On a display part 84 occupying most of the liquid crystal display part 82, an image picture (a print image) for the character image to be printed, and menu and options during the editing of the character image are displayed in addition to the character image. In addition, when the print image is displayed on the liquid crystal display part 82, the image can be displayed by four gradations (four-gradation display).

The tape print apparatus 1 is designed to turn the indicators 85 on to display what contents of the input state (input in romaji (Roman letters), kana or the like) from the keyboard 3, the typeface (Mincho type, Gothic type or the like) for the character image during printing, the print style (the vertical writing, the constant-length print or the like), and the background (the ground tint pattern or the like) for the character image and so forth are set during the use thereof. Therefore, for example, when the input state is the input in romaji, the indicator 85 arranged directly below the "romaji" in the mode describing part 83 is turned on, and when Gothic type is designated as the typeface for the character image, the indicator 85 arranged directly below "Gothic type" in the mode describing part 83 is turned on.

Figure 5:
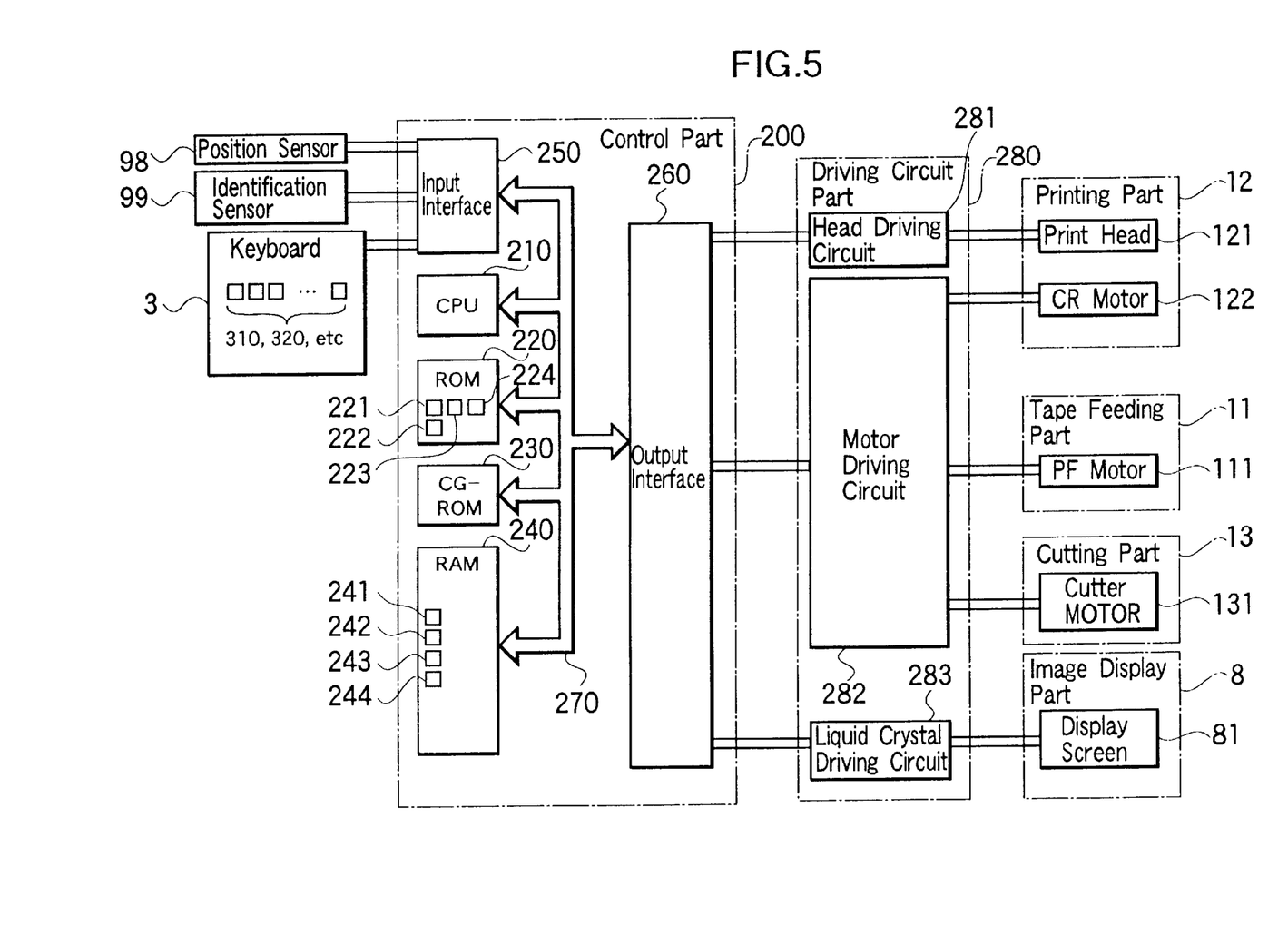
FIG. 5 is a block diagram of a control system of the tape printing apparatus in the preferred embodiment.

Referring to FIG. 5, the basic construction of a control system of the tape printing apparatus 1 will be described below.

As shown in FIG. 5, the control of the tape printing apparatus 1 is executed by a control part 200 in response to input signals from the keyboard 3, the position sensor 98 and the identification sensor 99. The control part 200 is designed to control the printing part 12, the tape feeding part 11, the cutting part 13 and the image display part 8 by means of a driving circuit part 280.

The control part 200 has a CPU 210, a ROM 220, a character generator ROM (CG-ROM) 230, a RAM 240, an input interface 250 and an output interface 260, which are connected to each other by means of a bus 270.

The ROM 220 has stored therein a color converting table 221, a character modifying table 222 and so forth, in addition to control programs processed by the CPU 210. As the control programs, a color format editing program 223 and a preview display program 224, which will be described later, are also stored.

The CG-ROM 230 has stored therein font data for characters, such as letters, symbols and figures, which have been prepared in the tape printing apparatus 1. When code data for identifying characters are given, the CG-ROM 230 outputs the corresponding font data.

The RAM 240 has regions for various register groups 241, a text memory 242 for storing text data for characters inputted from the keyboard 3, a display image data memory 243 for storing display image data for the display screen 81, and a printed image data memory 244 for storing printed image data. These regions are used as operation regions for control processing. Furthermore, the RAM 240 is supplied with power supply by means of a backup power supply circuit (not shown) so that the RAM 240 holds the stored data even if a power supply is turned off.

The input interface 250 is a circuit, which is connected to the keyboard 3, the position sensor 98 and the identification sensor 99, for allowing various commands and input data from the keyboard 3, position detecting signals from the position sensor 98, and identification information signals from the identification sensor 99, to be incorporated into the bus 270. In addition, the output interface 260 is a circuit for outputting data and control signals, which have been outputted from the CPU 210 or the like to the bus 270, to the driving circuit part 280.

The position sensor 98 is designed to detect that the print head 121 reaches the home position to input the detected signals to the control part 200, and the identification sensor 99 is designed to detect the kinds of the tape cartridge 4 and the tape T and the print starting position so as to input the detected signals to the control part 200.

The driving circuit part 280 comprises a head driving circuit 281, a motor driving circuit 282 and a liquid crystal driving circuit 283. The head driving circuit 281 is designed to drive the print head 121 of the printing part 12 in accordance with a control signal outputted from the control part 200. Similarly, the motor driving circuit 282 is designed to drive the CR motor 122 of the printing part 12, the PF motor 111 of the tape feeding part 11, and the cutter motor 131 of the cutting part 13 in accordance with the indication of the control part 200. Similarly, the liquid crystal display circuit 283 is designed to control the image display part 8 in accordance with the indication of the control part 200.

In the control system with such a construction, the CPU 210 of the control part 200 receives various commands and various data from the keyboard 3, the position detecting signals from the position sensor 98, and the identification information signals from the identification sensor 99, via the input interface 250 in accordance with the control program in the ROM 220, and processes the font data from the CG-ROM 230, and various data in the RAM 240 to output control signals to the driving circuit part 280 via the output interface 260. By the control signals, the printing control and the display control for the display screen 81 are carried out, and the print head 121 is controlled to carry out the color printing on the tape T on predetermined printing conditions. Thus, the whole tape printing apparatus 1 is controlled.

Referring to the accompanying drawings, the operating procedure and operation for preparing a label by means of the tape printing apparatus 1 will be described below.

First, when a power supply is turned ON to start the tape printing apparatus 1, an image displayed immediately before the power supply is turned OFF during the last starting is displayed on the display screen 81. That is, even if the power supply is turned OFF in this tape printing apparatus 1, the RAM 240 is designed to store therein data concerning the last image, together with the editing data thereof, in addition to various set data registered by a user, so that an image based on the data for the image and the editing data is displayed on the display screen 81 immediately after the starting. Furthermore, when the power supply has been turned OFF after all of images of input characters or the like are erased during the last starting, or when the tape printing apparatus 1 is first used, only a line headmark (a mark wherein a line number is surrounded by a quadrangle) indicative of a line during printing is displayed on the display part 84 of the display screen 81 as shown in FIG. 6.

Figure 6:
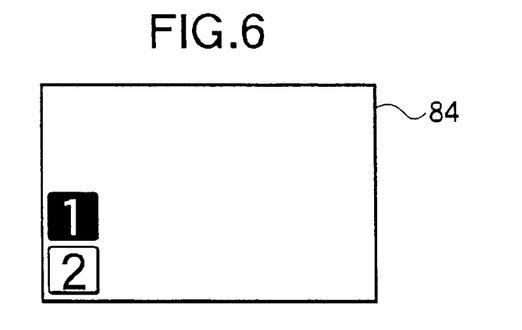
FIG. 6 is a schematic diagram for explaining an initial screen of the display part of the tape printing apparatus in the preferred embodiment.

When only the line head mark shown in FIG. 6 is displayed, a process for inputting a character string "Fragile" to edit the character string in various ways to print the edited character string to prepare a label will be described in due order.

Figure 7:
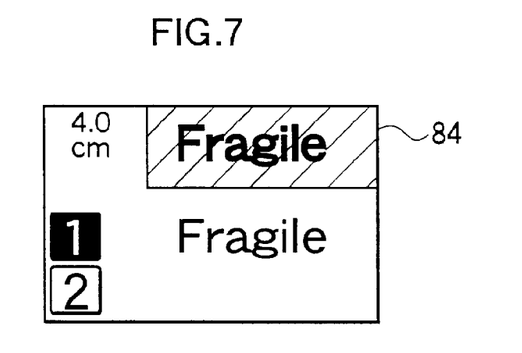
FIG. 7 is a schematic diagram showing the display part in the preferred embodiment when characters are inputted.

FIG. 7 shows the display part 84 immediately after the character string "Fragile" is inputted.

As the character input screens of the tape printing apparatus 1, there are a usual input screen, which uses the whole area of the display part 84 for displaying inputted characters, and an input screen with print image, which uses a part of the display part 84 for displaying inputted characters and which uses the residual part of the display part 84 for displaying a print image. As the input screen with print image, there are a plurality of input screens in accordance with the size of the part used for displaying the print image. For example, when four lines of characters can be displayed on the display part 84, there are an input screen using one line for displaying the print image and three lines for displaying the inputted characters, an input screen using two lines for displaying the print image and two lines for displaying the inputted characters, and an input screen using three lines for displaying the print image and one line for displaying the inputted characters.

By operating a predetermined one of the function key 320 (e.g., the lower, most left key), it is possible to select which input screen should be applied. Even if the power supply is turned OFF, information concerning which input screen should be applied is held. FIG. 7 shows an input screen which uses two lines for displaying a print image and two lines for displaying inputted characters when a character string "Fragile" is inputted.

As shown in FIG. 7, if the character string "Fragile" is inputted, the character string "Fragile", together with its printed image and label length (which will be hereinafter referred to as a "tape length"), which are arranged on the upper half thereof, is displayed on the display part 84.

This printed image is displayed on the display part 84 by allowing data concerning the character string "Fragile" to be expanded for the printed image by means of the RAM 240 and outputting control signals to the liquid crystal driving circuit 283. On the other hand, the tape length is displayed as a value obtained by adding front and rear margins to a value which is calculated on the basis of the size of each of the characters of "Fragile", the number of the characters and the character gap (i.e. distance between adjacent two of the characters). Furthermore, in the tape printing apparatus 1, the user can set the length of a label to prepare the label having a constant length (a constant-length printing). In this case, the set length is displayed as the tape length.

Furthermore, a method for displaying a print image on an input screen with print image will be described in detail below.

Although it is possible to prepare a label by inputting the character string "Fragile" as described above and printing the inputted character string as it is, the tape printing system 1 can edit the inputted characters and so forth in various ways to prepare an expressive label.

Edited items will be briefly described below. As units for editing, there are three stages of formats, styles and modes. The formats relate to the whole label. Among the formats, one having no relation to color is called a sentence format, and one relating to color is called a color format. The styles relate to each part (which will be hereinafter referred to as a "paragraph"), which has, e.g., one or more characters wished to have different attributes even if the number of lines is different or the same and which is divided in a longitudinal direction of the label. Among the styles, one having no relation to color is called a paragraph style, and one relating to color is called a color style. The modes relate to each of characters. Among the modes, one having no relation to color is called a character mode, and one relating to color is called a color mode.

Furthermore, the mode relating to each of characters can be designation (of the character string) of a paragraph or the whole label according to its designation. In addition, the style relating to each of paragraphs can be designation (of the character string) of the whole label according to its designation.

The edited items belonging to the sentence format include (1) a ground tint attribute relating to the selection of the kind of a background pattern (a ground tint), (2) a ground tint pattern attribute relating to the size of a ground tint, (3) a constant-length printing attribute relating to the selection of a length in the constant-length printing, (4) a justification attribute relating to the arrangement of each of characters in the constant-length printed label (front justification, centering, equal space, rear justification), (5) a margin attribute relating to the amount of margins provided on the front and rear sides in longitudinal directions of a label, and so forth.

The edited items belonging to the color format include (1) a background color attribute for defining the color of the background, (2) a ground tint color attribute for defining the color of the ground tint, and so forth.

The edited items belonging to the paragraph style include (1) a character size attribute relating to (the combination of) the character size on each line, (2) an alignment attribute relating to how to arrange character strings on each line (front-aligned, centering, equal space, rear-aligned), (3) an outer frame/tabular form attribute relating to the application of frame or table constituting lines for paragraphs, and so forth.

The edited items belonging to the color style include (1) a closing-line color attribute defining the color of closing lines (the frame or table constituting lines) when a document has the closing lines, (2) an intraframe color attribute defining the color in an outer frame (including an outer peripheral frame in the case of a tabular form) when a paragraph has the outer frame, and so forth.

The edited items belonging to the character mode includes (1) a vertical/horizontal attribute defining whether a character serving as an object should be vertically or horizontally written, (2) a Japanese character typeface attribute defining a Japanese character typeface for a character serving as an object, (3) an alphanumeric character typeface attribute defining an alphanumeric character typeface for a character serving as an object, (4) a decorative character attribute defining a modification for a character serving as an object (outline character, shadow character, italic character, highlighted character, etc.), (5) an expansion/contraction attribute defining whether a character serving as an object should be expanded or contracted from a basic character size on a line, to which the character belongs, (6) an arrangement attribute defining whether the expanded or contracted character should be arranged at the same position as, below or above the basic position on the line, (7) an enclosing/meshing attribute defining whether enclosing or half-tone dot meshing should be applied to a character serving as an object, (8) a character gap attribute defining a gap between a character serving as an object and the next character, (9) a pitch attribute defining whether the character gap should be automatically determined or fixed, and so forth.

The edited items belonging to the color mode include (1) a character color attribute defining the color of a character serving as an object, (2) an outline color attribute defining the color of the outline of a character when the character includes the outline, (3) a character shadow color attribute defining the color of the shadow of a character when the character has the shadow, (4) an enclosing-line color attribute defining the color of the enclosing line of a character when the character has the enclosing line, (5) an intra-enclosure color attribute defining the color in the enclosure of a character when the character has the enclosure, (6) a half-tone dot meshing color attribute defining the color of the half-tone dot meshing of a character when the character has the half-tone dot meshing, and so forth.

As described above, there are a wide range of edited items having an influence on the printing processing. Therefore, the tape printing apparatus 1 does not have any editing modes every edited item, and have six kinds of inclusive editing modes, such as a sentence format editing mode, a color format editing mode, a paragraph style editing mode, a color style editing mode, a character mode editing mode and a color mode editing mode.

By editing in the color format editing mode, the color style editing mode and the color mode editing mode among these editing modes, it is possible to define the colors of characters, background and so forth on a label. Even if the printed result (the printed image) on the label is thus colored, the print image can not be colored since the display device of the tape printing apparatus 1 is the monochrome liquid crystal display. Therefore, the print image is provided by gradation (lightness).

It is herein considered that a print image having gradation reflecting the gradation of the printed image is displayed. In this case, the number of stages of gradations capable of being controlled by a monochrome liquid crystal display is increased, so that an expensive monochrome liquid crystal display must be applied. In addition, the processing load is increased by the increased number of stages of gradations. On the other hand, if a simple two-gradation monochrome liquid crystal display is applied, only the distinguishing of the background and characters on the print image can be carried out, and color information is completely omitted.

Therefore, a monochrome liquid crystal display having about four gradations is preferably applied. When a four-gradation monochrome liquid crystal display is applied, it is considered that background decoration takes precedence to display characters at the highest density and to display background decoration by three gradations. Also in this case, color information is completely omitted. In addition, even if background decoration is displayed by three gradations, since the original printed image having multiple stages of gradations (e.g., 64 gradations) is replaced with an image having three gradations, the printed image is sometimes indistinct, and the graduation converting load is heavy.

For that reason, a four-gradation monochrome liquid crystal display is applied to the tape printing apparatus 1, and the assignment of four gradations to the print image is carried out as shown in FIGS. 8A, 8B, 9A and 9B.

Figure 8A:
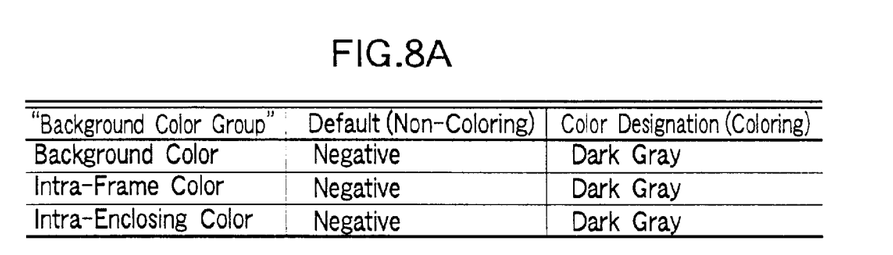
FIGS. 8A and 8B are tables showing the assignment of gradations on an input screen with print image in the preferred embodiment.
Figure 8B:
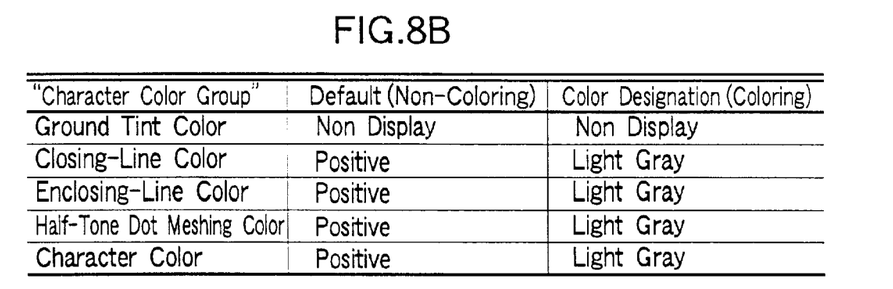
Figure 9A:
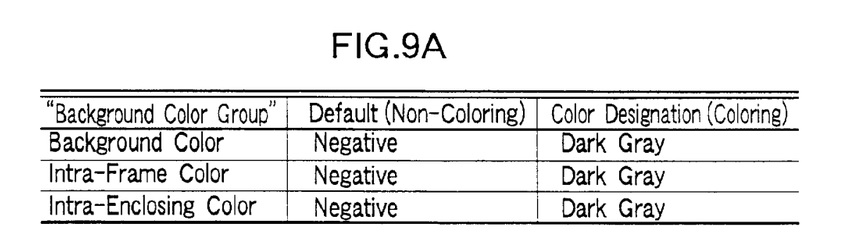
FIGS. 9A and 9B are tables showing the assignment gradations for displaying a print image by a preview display function in the preferred embodiment.
Figure 9B:
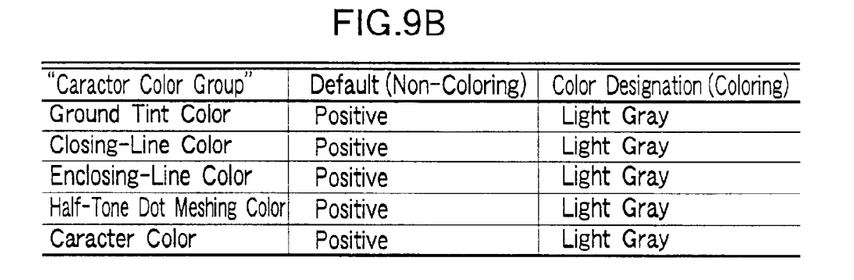

FIGS. 8A and 8B show a four-gradation assignment for displaying a print image on an input screen with print image, and FIGS. 9A and 9B show a four-gradation assignment for displaying a print image on a print image sole display screen.

Furthermore, the tape printing apparatus 1 has a print image display function (a preview display function) of using and scrolling substantially the whole area of the display part 84 to display a printed image in accordance with the operation of a predetermined one of the function keys 320. The four-gradation assignment on the print image sole display screen based on the preview display function is shown in FIGS. 9A and 9B. The display of print image based on the preview display function provides a print image for the whole label by utilizing the scroll function. On the other hand, the print image on the input screen with print image fixedly provides a print image of part or whole label including a character, at which the cursor is positioned (there are some cases where a portion of a label displayed by the input of the character or the movement of the cursor moves).

In FIGS. 8A, 8B, 9A and 9B, four gradations are expressed by a negative (black), a dark gray, and a light gray and a positive (white), respectively, in order from a lower graduation (lightness).

The technical idea common to FIGS. 8A, 8B, 9A and 9B is as follows. With respect to a region (which will be hereinafter referred to as a "background color group"), in which there is some possibility of being plastered with ink during printing, such as a background color, an intraframe color or an intra-enclosure color, the negative is displayed on the print image when non-coloring is set, and the dark gray is displayed on the print image when coloring is set. In addition, with respect to a line based portion (which will be hereinafter referred to as a "character color group), which is not plastered with ink during printing, such as the character color, the closing-line color, the enclosing-line color or the half-tone dot meshing color, the positive is displayed on the print image when non-coloring is set, and the light gray is displayed on the print image when coloring is set.

Furthermore, the "non-coloring" means that any inks are not applied on the printed tape T1 during printing. As a color, "transparent" is prepared. For example, with respect to an image region wherein the background color is set to be "black" and the character color is set to be "transparent", black is printed in actual printing since the character color is "transparent". In this preferred embodiment, "transparent" is treated as coloring. In any edited items relating to color, the set value of default is non-coloring.

In a region for displaying inputted characters (a region other than a region for displaying a print image) on the input screen with print image, the ground color is displayed by the positive, and the color of characters is displayed by the negative. From the relationship to the display gradations, the display gradations of the print image on the input screen with print image are elected as shown in FIGS. 8A and 8B.

Between the display of the print image on the input screen with print image and the display of the print image on the print image sole display screen, the treatment of the ground tint color is different as shown in FIGS. 8A, 8B 9A and 9B. That is, in the case of the display of the print image on the input screen with print image, the presence of the ground tint is treated as no ground tint. On the other hand, in the case of the display of the print image on the print image sole display screen, the ground tint is displayed by the positive on the print image when non-coloring is set and by the light gray on the print image when coloring is set, similar to other edited items of the character color group. Such a difference is defined in view of the difference in size of the displayed print image.

Furthermore, FIGS. 8A, 8B, 9A and 9B show part of edited items. In fact, in addition to the elements of the character color group shown in FIGS. 8A, 8B, 9A and 9B, the edited items include the outline color when the character has the outline, the character shadow color when the character has the shadow, and so forth. These edited items are treated similar to other elements of the character color group. Furthermore, since the outline color and character shadow color have little influence on the whole print image even if the display gradation is changed by the presence of the coloring for the outline color and character shadow color in the display of the small print image, the outline color and character shadow color may be ignored in both displays for the print image.

Figure 10:
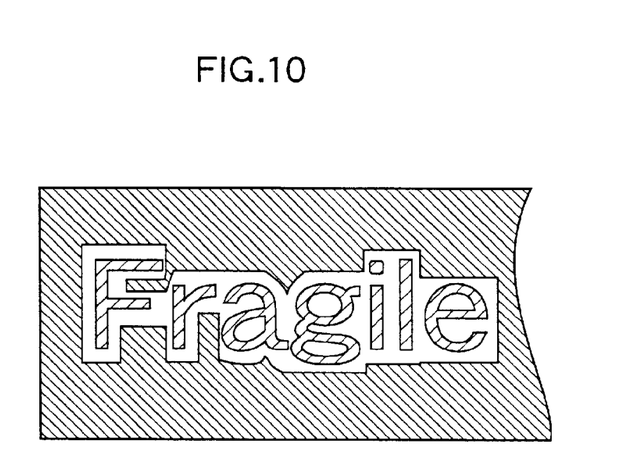
FIG. 10 is a schematic diagram for explaining an example of a displayed print image in the preferred embodiment.

FIG. 10 shows an example of an print image displayed on a print image sole display screen (only a part is shown). The print image part on the input screen with print image is the same since no ground tint exists in this example. In the example of FIG. 10, the coloring is set with respect to all of the edited items for colors belonging to the color format, the non-coloring is set with respect to all of the edited items for colors belonging to the color style, and the coloring is set for only the character color with respect to the edited items for colors belonging to the color mode. Therefore, the background portion has "dark gray", and the character portion has "light gray". In addition, the portion around characters has "positive" in order to clarify outline characters on the colored background. By the assignment of four gradations as shown in FIGS. 8A, 8B, 9A and 9B, it is possible to provide a print image capable of sufficiently providing user's image about the printed result in spite of the display of only four gradations.

Referring to the accompanying drawings, an example of a processing having an influence on the display of a print image on an input screen with print image will be described in detail below.

Figure 11:
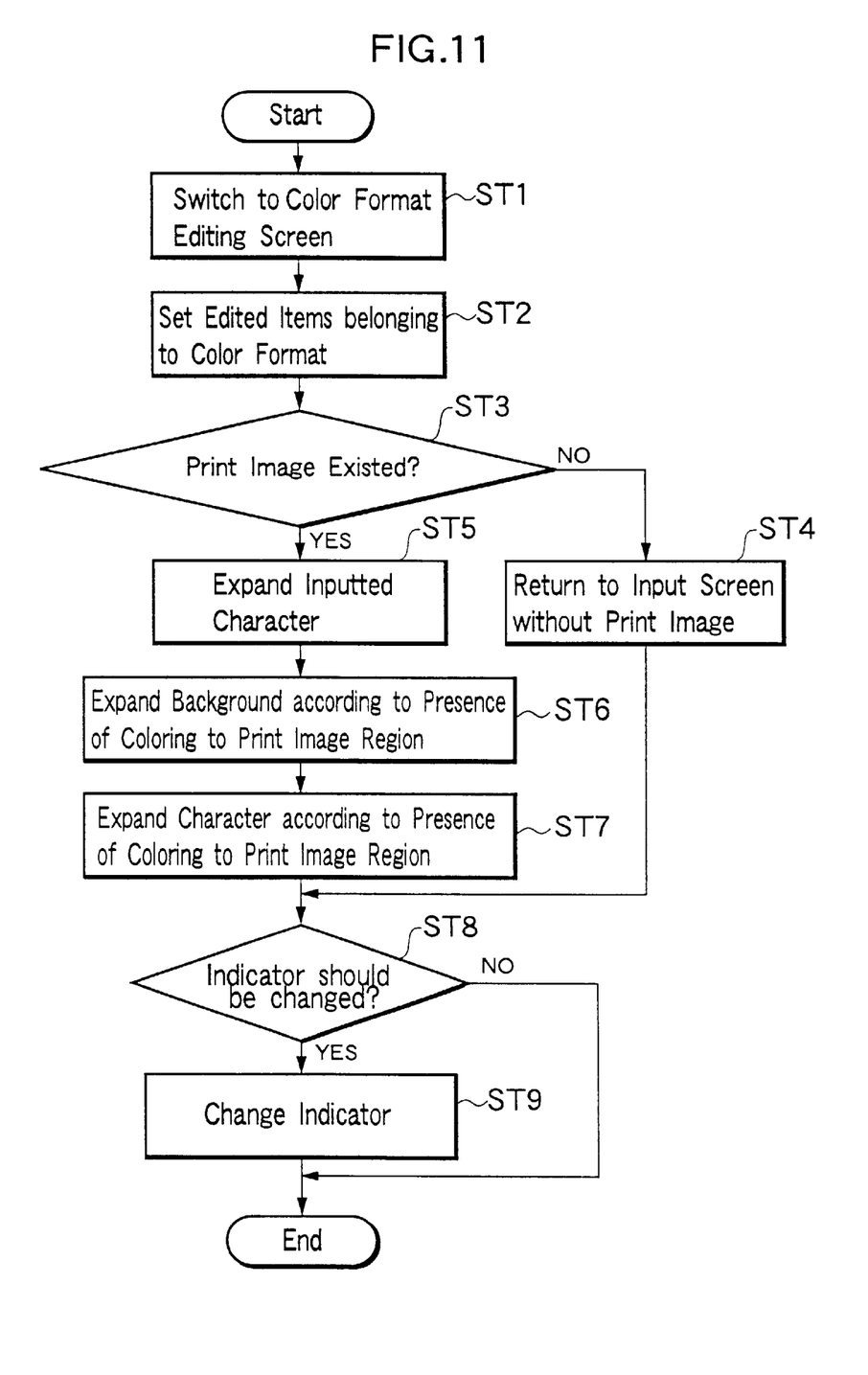
FIG. 11 is a flow chart showing a color format editing processing in the preferred embodiment.

FIG. 11 is a flow chart showing a processing (a color format editing program 223) for setting and updating the edited items belonging to the color format.

In order to set or update (edit) the edited items belonging to the color format, the user operates a predetermined one of the function keys 320 for starting the processing for editing the color format to change the operation mode from the input mode to the color format editing mode. At this time, the CPU 210 starts to execute the color format editing program 223 shown in FIG. 11, to cause the editing screen for the color format editing mode to be displayed on the display part 84 (step ST1). Then, the CPU 210 executes the editing with respect to a desired edited item (step ST2).

Figure 12A:
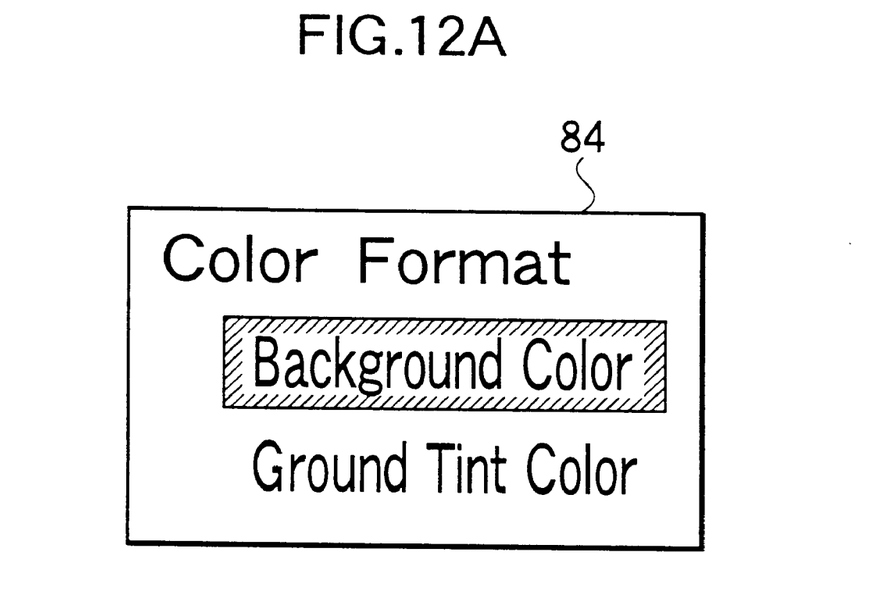
FIGS. 12A and 12B are schematic diagrams for explaining an example of an editing screen for setting a background color in the preferred embodiment.
Figure 12B:
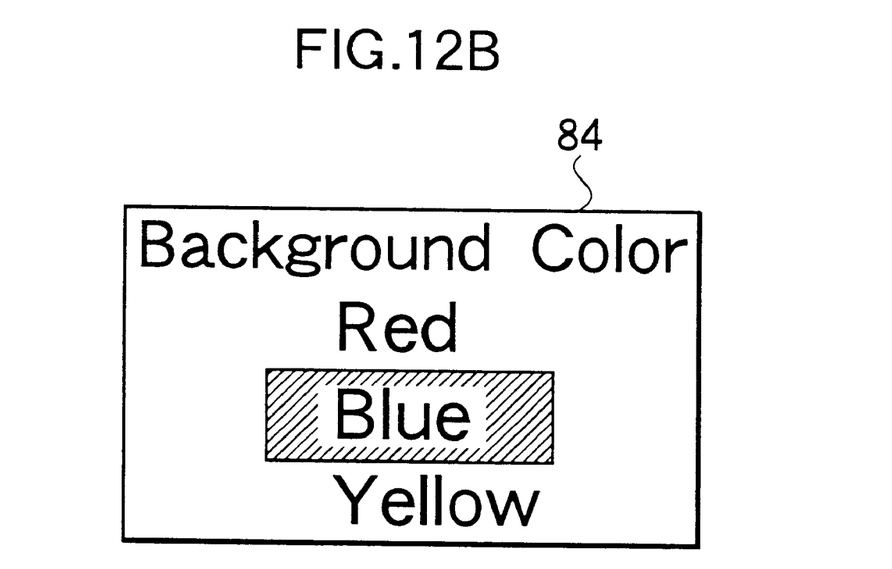

For example, the processing at step ST2 is as follows. The initially displayed editing screen (the editing screen in the first hierarchy) includes the names of the edited items belonging to the color format as first hierarchy elements. That is, an editing screen (the title of this screen is, e.g., "color format") shown in FIG. 12A, which includes the names of the above described background color attribute and ground tint color attribute, is displayed. Then, the user suitably operates to set the cursor at the name of a desired attribute to depress the select key 328 to display an editing screen in the second hierarchy for concretely designating color, and then, the user suitably operates the cursor key 327 to set the cursor at a desired color (option) to depress the select key 328. By the similar operation, the user carries out the color setting for other edited items (attribute) belonging to the color format, if necessary. FIG. 12B shows an example of an editing screen (the title of this screen is "background color") in the second hierarchy with respect to the background color attribute. In this example, the cursor is positioned at "blue".

When the color setting for the edited items (attribute) belonging to the color format is completed, the CPU 210 carries out a processing for returning the screen to the input screen at the following steps ST3 through ST7.

First, the CPU 210 confirms whether the input screen before commanding the editing of the color format is the input screen with print image (step ST3). Then, if the input screen has no print image, the CPU 210 returns the input screen to an input screen only including the inputted character string (step ST4).

On the other hand, when the input screen before commanding the editing of the color format is the input screen with print image, the CPU 210 expands the inputted characters to a display region of inputted characters other than the display region of the print image (step ST5). Thereafter, the CPU 210 causes the set values (set colors) of the presently set edited items relating to the color format, as well as the set values (set colors) of the edited items relating to the color style and the color mode, to be reflected in the display region of the print image (naturally, the set values having no relation to color are also reflected), and expands the background image on the display conditions of FIG. 8A in accordance with the coloring or non-coloring of the edited items relating to the background group (step ST6). Moreover, the CPU 210 causes the set values (set colors) of the edited items relating to the color style and the color mode to be reflected in the display region of the print image (the edited items relating to the color format does not include the edited items belonging to the character color group, and the set values having no relation to color (e.g., character size) are naturally reflected), and expands the character image on the display gradation conditions of FIG. 8B in accordance with the coloring or non-coloring of the edited items relating to the character color group (step ST6). The image data thus expanded are supplied to the monochrome liquid crystal display, so that the input screen with print image is displayed on the display part 84.

When the CPU 210 returns the screen to the input screen as described above, the CPU 210 determines whether it is required to change the indicator 85 after the present setting of the edited items relating to the color format (step ST8). If necessary, the CPU 210 changes the indicator 85 (step ST9), ends the color format editing program 223, and changes the operation mode from color format editing mode to the input mode.

While the processing during the editing of the color format has been described, the processing during the editing of the color style and the processing during the editing of the color mode are carried out in a substantially similar manner. That is, when the setting of the edited items is completed to return the screen to the input screen, if the input screen is the input screen with print image, the display of the print image is reflected in the newly set values (set colors), and the expansion is carried out on the display gradation conditions shown in FIGS. 8A and 8B.

As described above, the display of the print image on the input screen with print image is also suitably changed by changing the set values (set colors) of the edited items belonging to the color format, the color style or the color mode. Also, when a character is additionally inputted in the input mode, the display of the print image on the input screen with print image is changed although the flow chart of such a processing is not shown. Although the additionally inputted character is contained in the display of the print image, the display gradation is elected in accordance with the non-coloring or coloring of the character color set for the character.

Furthermore, the character color of the inputted character has been defined as follows. Between a certain character, for which a character color has been set, and another character after another character color has been set, the same character color as that of the character, for which the character color has been set on the front side, is set. Furthermore, a default value has been set for the head character of a character string unless the character color has been intentionally set.

Although printing may be carried out immediately after the editing of the inputted characters is carried out as described above, the tape printing apparatus 1 has the following confirmation functions.

First, the tape printing apparatus 1 has a property display function of collectively or gradually displaying set value information (print information) based on the editing contents, on the display part 84 of the display screen 81 to allow the user to confirm the set value information based on the editing contents. Secondly, the tape printing apparatus 1 has a preview display function of simply allowing the user to confirm the print image for the whole label. Furthermore, since the display of the print image on the input screen with print image is not always intended for the whole label, the preview display function is effective.

Figure 13:
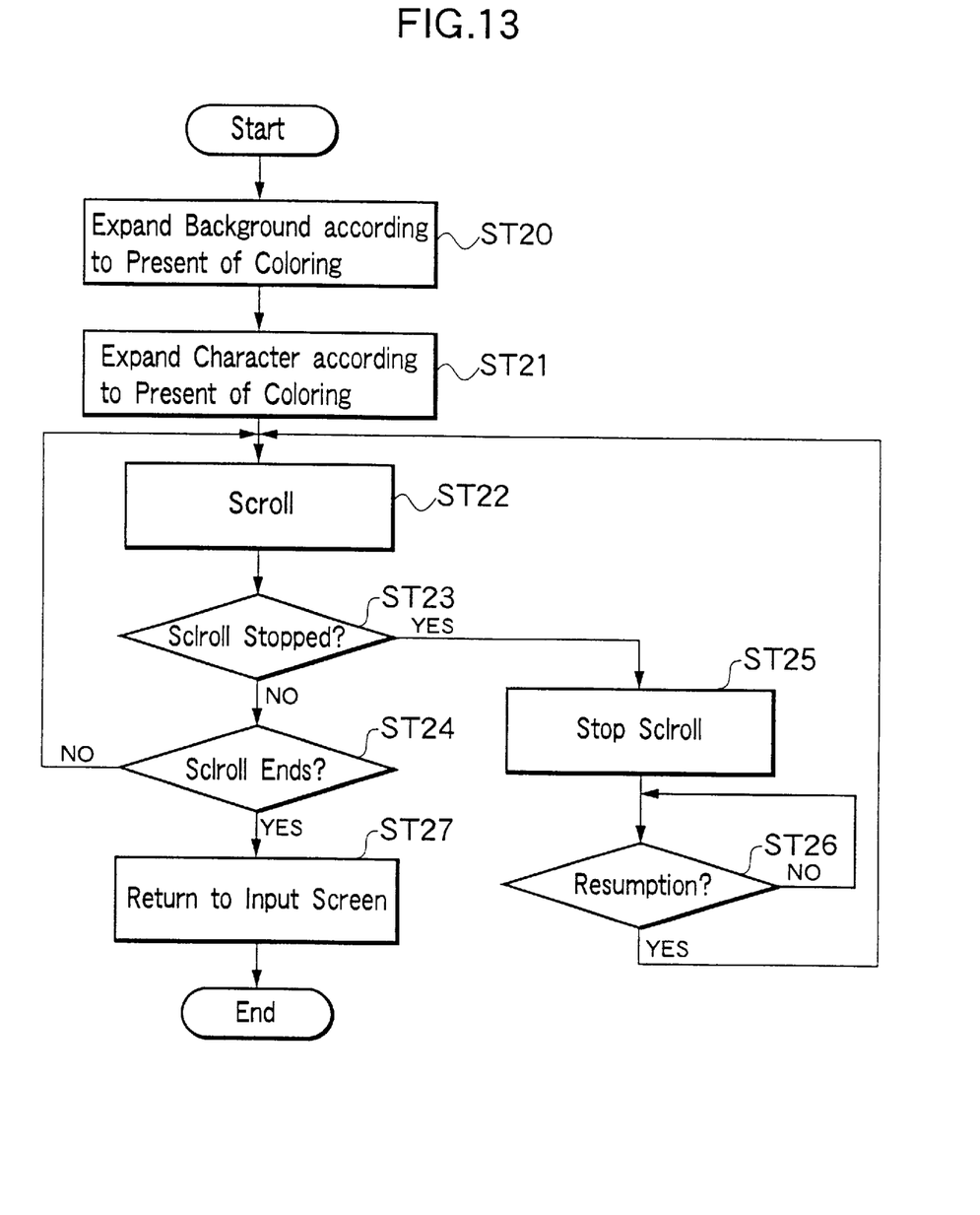
FIG. 13 is a flow chart showing a preview display processing in the preferred embodiment.

Referring to the accompanying drawings, a processing for the preview display function serving as one of the features of the tape printing apparatus 1 will be described in detail below. FIG. 13 is a flow chart showing a preview display processing (a preview display program 224).

When the user wish to display a print image based on the preview display function, the user operates the function key 320 corresponding to the preview display function. At this time, the CPU 210 starts to execute the preview display program 224 shown in FIG. 13.

Then, the CPU 210 causes the set values (set colors) of the edited items relating to the color format, the color style and the color mode to be reflected in the whole label (the set values having no relation to color are also naturally reflected), and expands the background image on the display conditions of FIG. 9A in accordance with the coloring or non-coloring of the edited items relating to the background color group (step ST20). Moreover, the CPU 210 causes the set values (set colors) of the edited items relating to the color style and the color mode to be reflected in the whole label (the edited items relating to the color format do not include the edited items relating to the character color group, and the set values having no relation to color (e.g., character size) are naturally reflected), and expands the character image on the display gradation conditions of FIG. 9B in accordance with the coloring or non-coloring of the edited items relating to the character color group (step ST21).

When the expansion described above is completed, the CPU 210 supplies the expanded image data (gradation data) to the monochrome liquid crystal display while shifting the place of the image data every predetermined cycles by the size of the display part 84, and allows the scroll display of a composite image (a print image) of the background image and the character image on the display part 84 (step ST22).

While such a scroll display is carried out, the CPU 210 monitors whether a predetermined one of the function keys 320 for stopping the scroll has been operated (step ST23) and whether the print image for the whole label has been provided by the scroll display (step ST24).

When the predetermined one of the function keys 320 for stopping the scroll is operated while the scroll display is carried out, the CPU 210 stops the data transfer to the monochrome liquid crystal display, i.e., stops the scroll, to fixedly display the displayed image at that time (step ST25). At this time, the CPU 210 waits for the operation of a predetermined one of the function keys 320 for stopping and releasing the scroll, and resumes the scroll display (step ST26).

On the other hand, after the print image for the whole label is completely provided by the scroll display, the CPU 210 waits for a predetermined period of time, or waits for the operation of an optional key, to return the display screen to the input screen (step ST27), and ends the preview display program 224. The returning to the input screen in this case is carried out in the same manner as that described above in detail in FIG. 11, if the input screen is the input screen with print image.

Furthermore, while the example of the processing in FIG. 13 has been completely temporally divided into expansion and output to the monochrome liquid crystal display, the expansion and output may be executed in parallel.

After the editing contents and the print image for the whole label are confirmed by the property display function and the preview display function, the user operates the print key 321 to command print. At this time, a printed image (a composite image of the background image and the character image) reflecting the set values based on the editing is printed on the printed tape T1, and the laminate tape T2 is stuck on the printed part of the printed tape T1. Thereafter, the printed part of the tape T is discharged from the tape exit 10 to the outside to be cut by the cutting part 13 to complete a label.

As described above, according to the above described preferred embodiment, when the images of the print images for color-printable background and characters are superposed on each other to be displayed on the display part, the assignment of four gradations is carried out so as to distinguish four cases of the presence of coloring of the background image and the presence of coloring of the character image from each other. Therefore, even if the display part comprises a monochrome liquid crystal display, it is possible to easily and clearly distinguish the character image from the background image.

In addition, according to the above described preferred embodiment, since the display gradations on the print image are defined by only the coloring or non-coloring of the background image and the character image, it is not required to carry out a gradation converting processing for defining display gradations on the basis of the gradations of the background image and the character image, so that it is possible to rapidly execute the processing for displaying the print image and to decrease the CPU's processing load.

Moreover, since the display device uses the four-gradation monochrome liquid crystal display even if the print device can carry out color print, it is possible to provide an inexpensive and simple tape printing apparatus.

Furthermore, while the assignment of gradations for the display of the print image has been described in FIGS. 8A and 8B or FIGS. 9A and 9B in the above described preferred embodiment, the assignment of gradations according to present invention should not be limited thereto, as long as four gradations are assigned so as to distinguish four cases of the presence of coloring of the background image and the presence of coloring of the character image. For example, if inputted characters are displayed by the positive (outline characters on the colored background) on the input screen with print image, the non-coloring of the background image on the print image may be assigned to the negative, and other gradations may be defined in view of this.

In addition, while all of the contents printed on the printed tape T1 have been inputted by the keyboard 3 of the tape printing apparatus 1 in the above described preferred embodiment, the present invention may be applied to a tape printing apparatus for printing an image read from a color image scanner on the printed tape T1 as it is or for pasting the image read from the color image scanner on a part of a character string to print the image. In this case, when the read image is extracted, the read image is expressed by multiple gradations to clarify its pattern so as to be easy to be extracted. When a portion of the read image is expressed on a print image or when a region of the read image is expressed on a region for displaying inputted characters, one of four gradations may be utilized. For example, if the assignment of gradations shown in FIGS. 8A and 8B or FIGS. 9A and 9B is basically used, the light gray may be applied to the gradation of the read image portion. That is, the same gradation as that when coloring the character color group may be assigned.

In addition, while the tape printing apparatus in the above described preferred embodiment has been equipped with means for inputting a printed image (a character image and a background image) the tape printing apparatus may be applicable to the transfer of a printed image inputted by a personal computer or the like. In this case, the personal computer or the like constitutes the input means of the tape printing apparatus. In addition, the apparatus for carrying out printing may be an apparatus which does not have complete input means.

Moreover, in the above described preferred embodiment, while the present invention has been applied to the tape printing apparatus, the invention may be applied to a word processor or the like.

As described above, according to the present invention, when a color-printable character image is superposed on a color-printable background image to be displayed as a monochrome image, the first and second gradations are assigned to the non-coloring and coloring of an element of the background image, respectively, and the third and fourth gradations are assigned to the non-coloring and coloring of an element of the character image, respectively, so that a composite image of the background image and the character image is displayed. Therefore, it is possible to easily and clearly distinguish the character image from the background image by a simple processing.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. An image display device comprising:

means for displaying in monochrome a color-printable background image and a color-printable character image superposed on said background image; and gradation control means for assigning a first gradation of the monochrome and a second gradation of the monochrome to any respective non-colored and colored elements of said background image, and assigning a third gradation of the mononochrome and a fourth gradation of the monochrome to any respective non-colored and colored elements of said character image to display a composite image of said background image and said character image;

wherein said gradation control means set each of said first, second, third and fourth gradations exclusively to one of a negative monochrome gradation, a dark monochrome gradation, a light monochrome gradation and a positive monochrome gradation, not necessarily in the stated order;

said negative, dark, light and positive monochrome gradations being clearly distinguishable from each other.

2. An image display device according to claim 1, wherein said gradation control means sets said first gradation to said negative monochrome gradation, said second gradation to said dark monochrome gradation which is lighter than said negative monochrome gradation, said third gradation to said positive monochrome gradation which is lighter than said dark monochrome gradation and said fourth gradation to said light monochrome gradation which is darker that said positive monochrome gradation but lighter than said dark monochrome gradation.

3. An image display device according to claim 1, wherein said gradation control means does not display a ground tint element of said character image regardless of the non-coloring or coloring of said ground tint element.

4. An image display device according to claim 1, wherein said gradation control means alternatively displays said composite image of said background image and said character image (a) on an input screen with a print image or (b) on a sole print image screen, and causes the assignment of said first through fourth graduations when said composite image of said background image and said character image is displayed on said input screen with the print image to be different from the assignment of said first through fourth graduations when said composite image of said background image and said character image is displayed on said sole print image screen, with respect to at least a part of display elements.

5. An image display device according to claim 4, wherein said gradation control means causes the assignment of said first through fourth graduations when said composite image of said background image and said character image is displayed on said input screen with the print image to be different from the assignment of said first through fourth graduations when said composite image of said back ground image and said character image is displayed on said sole print image screen, with respect to a ground tint element of said character image.

6. An image display device according to claim 1, further comprising printing means capable of color-printing a display result of said image display device.

7. An image display method for displaying a color-printable background image and a color-printable character image superposed on said background image on a monochrome display having four gradations of monochrome, comprising the steps of:

assigning a first gradation of the monochrome to any non-colored display elements of said background image;

assigning a second gradation of the monochrome to any colored display elements of said background image;

assigning a third gradation of the monochrome to any non-colored display elements of said character image; and assigning a fourth gradation of the monochrome to any colored display elements of said character image;

wherein the first, second, third and fourth gradations are set exclusively to one of a negative monochrome gradation, a dark monochrome gradation, a light monochrome gradation and a positive monochrome gradation, not necessarily in the stated order;

the negative, dark, light and positive monochrome gradations being clearly distinguishable from each other.

8. An image display method according to claim 7 wherein the first gradation is set to the negative monochrome gradation, the second gradation is set to the dark monochrome gradation lighter than said negative monochrome gradation, the third gradation is set to the positive monochrome gradation, and the fourth gradation is set to the light monochrome gradation which is lighter than said dark monochrome gradation but darker than said positive monochrome gradation.

\* \* \* \* \*